(12) United States Patent
Itou et al.

(10) Patent No.: US 7,931,330 B2
(45) Date of Patent: Apr. 26, 2011

(54) AIR CONDITIONING SEAT

(75) Inventors: Hidehiro Itou, Aichi-ken (JP); Hisaya Mori, Aichi-ken (JP); Yasuhiko Niimi, Handa (JP)

(73) Assignees: Toyota Boshoku Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 213 days.

(21) Appl. No.: 12/234,823

(22) Filed: Sep. 22, 2008

(65) Prior Publication Data

US 2009/0079236 A1   Mar. 26, 2009

(30) Foreign Application Priority Data

Sep. 25, 2007   (JP) .................................. 2007-247211

(51) Int. Cl.
*A47C 7/72* (2006.01)
(52) U.S. Cl. .................................................. 297/180.14
(58) Field of Classification Search ............... 297/180.1, 297/180.14, 180.13
See application file for complete search history.

(56) References Cited

U.S. PATENT DOCUMENTS

| | | | |
|---|---|---|---|
| 6,179,706 B1 * | 1/2001 | Yoshinori et al. ............. | 454/120 |
| 6,196,627 B1 * | 3/2001 | Faust et al. .................. | 297/180.14 |
| 6,685,553 B2 | 2/2004 | Aoki | |
| 6,808,230 B2 * | 10/2004 | Buss et al. ................... | 297/180.12 |
| 6,848,742 B1 * | 2/2005 | Aoki et al. .................. | 297/180.14 |
| 7,070,232 B2 | 7/2006 | Minegishi et al. | |
| 2003/0186642 A1 | 10/2003 | Aoki | |
| 2004/0104607 A1 | 6/2004 | Minegishi et al. | |
| 2006/0060344 A1 | 3/2006 | Esaki | |
| 2006/0138812 A1 * | 6/2006 | Aoki ........................ | 297/180.14 |

FOREIGN PATENT DOCUMENTS

| | | |
|---|---|---|
| JP | 2001-145542 A | 5/2001 |
| JP | 2003-285629 A | 10/2003 |
| JP | 2004-73429 A | 3/2004 |
| JP | 2006-82589 A | 3/2006 |

OTHER PUBLICATIONS

English language Abstract of JP 2003-285629 A.
English language Abstract of JP 2004-73429 A.
English language Abstract of JP 2006-82589 A.
English language Abstract of JP 2001-145542 A.

* cited by examiner

*Primary Examiner* — Milton Nelson, Jr.
(74) *Attorney, Agent, or Firm* — Greenblum & Bernstein, P.L.C.

(57) ABSTRACT

An air conditioning seat includes a seat pad having a seating portion and a side support portion, blowing means for blowing air to an air path formed at the seat pad, a seat cover covering the seat pad, and a net-like cushion member capable of permeating air in a thickness direction and in a plane direction. An air path is formed at the seating portion of the seat pad. A hanging groove in a groove-like shape is recessed and on a boundary line of the seating portion and the side support portion. The an air blow out port of the air path is covered by the net-like cushion member. A communicating path reaching the net-like cushion member of the side support portion from the air path of the seating portion is formed by passing a back side of the hanging member at inside of the hanging groove.

4 Claims, 6 Drawing Sheets

AIR CONDITIONING SEAT

BACKGROUND OF THE INVENTION

1. Field of the Invention

The present invention relates to a vehicular air conditioning seat capable of blowing air from blowing means to a seating face (or the like) by passing through an air path formed at an inner portion of a seat pad.

2. Description of Related Art

An air conditioning seat of JP2003-285629A includes blowing means, a first pad, a second pad thinner than the first pad, and a seat cover having an air permeability. The blowing means is arranged at a back face of the first pad. The second pad is arranged at a surface of the first pad. The seat cover covers the second pad. The first pad includes a plurality of guide holes penetrated from a back face over to a surface thereof. A back face of the second pad is recessed to form an air distributing groove (air distributing path) in a groove-like shape. The second pad also includes a plurality of pieces of through holes. Air forcibly blown from the blowing means passes through the air distributing grooves and the plurality of through holes of the second pad from the guide holes of the first pad to be drawn to the seating face. A plurality of pieces of the air distributing grooves are formed at a portion excluding a side support portion. The respective air distributing grooves are communicated with the single guide hole.

According to the air conditioning seat, by forming the plurality of pieces of air distributing grooves, air guided from the single guide hole can be distributed in various directions by branching air to the respective air distributing grooves. However, the through hole constituting an air blow out port directly faces the seat cover. Thereby, there is a concern that the through hole is closed by the body of a passenger and a function as the air conditioning seat cannot be achieved.

An air conditioning seat of JP2004-73429A includes blowing means, the first pad, a net-like cushion member, and the seat cover having air permeability. The blowing means is arranged at a back face of the first pad. The first pad constitutes a main body of the seat pad, and includes a plurality of through holes. The net-like cushion member is arranged at a surface of the first pad. Respective through holes of the first pad are covered by the net-like cushion member. The seat cover covers a surface of the net-like cushion member. The net-like cushion member constitutes a three-dimensional structure bending to wave a number of continuous wire-like members respectively in a loop-like shape and melting to weld contact portions thereof. Thereby, the net-like cushion member is made to be air permeable in a thickness direction and in a plane direction while having a constant elasticity. By arranging such a net-like cushion member, air permeability is promoted while maintaining a cushioning performance without providing the air distributing grooves.

According to this air conditioning seat, the net-like cushion member is permeable in the thickness direction and the plane direction. Thereby, the through hole constituting the air blow out port is not closed by the body of the passenger. However, the air distributing grooves are not formed. Thereby, even when the net-like cushion member is air permeable in the plane direction, it is difficult to deliver air over a wide range. Therefore, when a number of the through holes are bored, the following problem is posed. A guide space for covering all of the through holes is needed. Or, a plurality of blowing means are needed. Thereby, ventilation is not efficient, which amounts to also a large-sized formation of the vehicular seat.

According to an air conditioning seat of JP2006-82589A, a resin plate is embedded to a bottom face of a groove recessed to be formed at a surface of a seat pad. A back face of a seat cover is arranged with a locking piece. By locking the resin plate and the locking piece by a locking metal piece, the seat cover is fixed following a shape of the seat pad. At the seat pad, a side support portion is formed to be bulged from the seating portion. A blowing device is arranged at inside of the side support portion. A net-like cushion member is arranged at surfaces of the seating portion and the side support portion of the seat pad in a state in which one end thereof faces a groove. The net-like cushion member at the portion is arranged with high rigidity fibers at a surface and a back face thereof, and the fibers at the surface and the back face are connected by string-like fibers capable of elongating and contracting in a thickness direction. Thereby, the net-like cushion member is made to be permeable in the thickness direction and in the plane direction while having a constant elasticity. On top thereof, air blown from the blowing device is made to flow at inside of an extended space in a seat width direction produced between the groove and the seat cover. Air is guided from the extended space to the net-like cushion members of the seating portion and the side support portion and the surface of the vehicular seat is ventilated. Thereby, the air distributing groove at the seat pad is dispensed with. By arranging the blowing device at the side support portion, thin-walled formation of the air conditioning seat is achieved.

According to this air conditioning seat, the net-like cushion members are arranged at the seating portion and the side support portion. Thereby, a total of the vehicular seat surface is provided with air permeability. However, the extended space between the groove and the seat cover is utilized as the air path. Thereby, a flow of air flowing at inside of the extended space is hampered by the seat cover, the locking piece, the resin plate, and the locking metal piece. In the worst case, the flow of air is interrupted. Thereby, air cannot smoothly be made to flow to the locking portion of the cover seat and permeability at a center portion of the vehicular seat is extremely deteriorated. Further, a position of arranging the blowing device is restricted to the side support portion, and therefore, a degree of freedom of designing the vehicular seat is low. A portion of making air flow to the net-like cushion member is disposed only at the groove portion, and therefore, even when the net-like cushion member is permeable in the plane direction, it is difficult to deliver air over a wide range including the seating portion.

Further, JP2001-145542A discloses a vehicular seat capable of controlling a temperature of the seating face. According to the vehicular seat, the seat pad is covered by a thin film which is difficult to be permeable and a surface of the thin film is provided with a permeable layer. The permeable layer is covered by a seat cover which is difficult to be permeable. A back face of the seat pad is provided with a blowing device. The seat pad and the thin film are respectively bored with a plurality of pieces of through holes. Warm air or cold air blown from the blowing means is circulated at inside of the permeable layer to be drawn to a back face of the seat pad without permeating the seat cover. The vehicular seat does not achieve a permeable seating face.

Thus, there is a need in the art for an air blow out port at the seat pad that does not close even when a passenger is seated thereon, air is arranged efficiently while firmly ensuring a permeability, and a total of a surface of the air conditioning seat is provided with the permeability.

BRIEF SUMMARY OF THE INVENTION

An air conditioning seat of the invention includes a seat pad integrally having a seating portion and a side support portion, blowing means for blowing air to an air path formed at the seat pad, a seat cover covering the seat pad, and a net-like cushion member having a constant elasticity and capable of permeating air in a thickness direction and in a plane direction. The side support portion is bulged to a surface side more than the seating portion on left and right outer sides of the seating portion. The air path is formed at a seating portion of the seat pad. The seat cover is provided with a permeability. A locking piece is provided at a back face of the seat cover. The net-like cushion member is provided with a three-dimensional solid structure by a fiber member. A hanging groove in a groove-like shape is recessed to be formed on a boundary line of the seating portion and the side support portion. A hanging member is provided at inside of the hanging groove. The locking piece is locked by the hanging member. A surface of the seating portion is arranged with the net-like cushion member. An air blow out port of the air path is covered by the net-like cushion member. Also a surface of the side support portion is arranged with the net-like cushion member. A communicating path reaching the net-like cushion member of the side support portion from the air path of the seating portion is formed by passing a back side of the hanging member at inside of the hanging groove.

The air conditioning seat is constituted by a surface shape to be precisely along a seating attitude of a passenger by including the seating portion and the side support portion. The seating portion is a portion for mainly supporting the passenger when the passenger is seated on the air conditioning seat. The side support portion is a portion of auxiliary supporting the passenger from an outer periphery side of the seating portion. By locking the locking piece of the seat cover by the hanging member at inside of the hanging groove, the seat cover is brought into close contact therewith in a state of following the surface shape of the seat pad by being drawn to inside of the hanging groove. By forming the hanging groove on the boundary line of the seating portion and the side support portion, that is, a point of changing the surface shape of the seat pad, the seat cover is made to follow the surface shape of the seat pad precisely. The blowing means is not particularly limited so far as the means can forcibly blow air. For example, well-known blowing means of a fan, a blower or the like can be used. The seat cover is not particularly limited so far as the seat cover is provided with the permeability. For example, other than woven cloth or mesh sheet, a well-known vehicular seat cover of cloth or leather formed with a number of small holes by laser machining can be used. As the locking piece, a hook in a J-like shape, or a cylindrical member in which a portion capable of fitting with the hanging member is opened can be used. Further, a fixing piece for fixing pertinently a locking piece and a hanging member may be used such that, for example, a locking piece and a hanging member are calked to fix by a ring in a C-like shape. The locking piece can be arranged at the back face of the seat cover by sewing or the like.

By providing the net-like cushion member covering the air blow out port of the air path with the constant elasticity at the surface of the seating portion, it can be avoided that the air blow out port is closed even when the passenger is seated on the air conditioning seat. At the same time, a seating comfort when the passenger is seated is improved. Air is permeable at inside of the net-like cushion member also in the plane direction, and therefore, even when the passenger is brought into close contact with the seating portion, air can be distributed such that air is expanded in a horizontal direction at inside of the net-like cushion member to avoid the passenger. Further, even when the passenger is seated thereon, the firm permeability can be ensured without closing the air blow out port at the seat pad. The net-like cushion member can also promote a heat insulating property of the seat pad by the special structure. Further, a portion of air arranged at inside of the air path is distributed also to the side support portion by passing the communicating path. Thereby, air conditioning at the side support portion can be carried out by way of the net-like cushion member. That is, a total of the surface of the air conditioning seat is provided with a permeability. At this occasion, when the communicating path of communicating the seating portion and the side support portion is formed to pass the back side of the hanging member at inside of the hanging groove, the flow of air flowing at inside of the communicating path is not hampered by the seat cover or the locking piece. Further, the surface according to the invention is a surface relative to the back face and does not signify the surface relative to the inner face (outer face). Therefore, in the seat back, the front face corresponds to the surface and in the seat cushion, the upper face corresponds to the surface.

The seat pad can be constructed by a constitution including a first pad constituting a main body of the seat pad, and a second pad arranged at a surface of the seating portion of the first pad. In this case, the seating portion, the side support portion and the hanging groove are formed at the first pad. It is preferable to make the second pad more thin-walled than the first pad. The net-like cushion member is arranged at the surface of the second pad and the surface of the side support portion of the first pad in a state in which respective one end faces thereof face the hanging groove. The air path can be constituted by a guide hole bored at the first pad, a series of air distributing grooves communicated with the guide hole, and a plurality of through holes constituting the air blow out ports. In this case, the guide hole is bored in a penetrated state, from the back face over to the surface of the first pad. It is preferable to depression to form the air distributing groove in a shape of a groove extended planarly in various directions at the seating portion. The respective through holes are bored in a penetrated state from the back face over to the surface of the second pad at the positions of facing the series of air distributing grooves.

The air distributing groove formed at the surface of the first pad constitutes the air path by being closed by the second pad. Therefore, air blown from the blowing means is first guided to inside of the seating portion of the seat pad from the guide hole of the first pad. Air guided from the guide hole is distributed in respective directions in a branched state at inside of the seating portion by the air distributing groove communicated with the guide hole. Air distributed in the respective directions by the air distributing groove is blown out from the through hole of the second pad and is drawn out to an outer side of the surface of the air conditioning seat by way of the net-like cushion member and the seat cover. Further, a portion of air blown from the blowing means reaches the side support portion by passing the back face of the hanging member of the hanging groove from the air distributing groove and flows also to inside of the net-like cushion member.

The cushion performance of the seat pad against the large load is ensured by the first pad constituting a main body thereof. On the other hand, the second pad is arranged to close the air distributing groove of the first pad while ensuring the through hole constituting the air blow out port. When the second pad is made to be thin-walled, it can be avoided that the seat pad is wastefully thickened. By providing the series of air distributing grooves communicating with the guide hole and expanded planarly in various directions as the air flow path and the through hole of the second pad communicating with the air distributing groove, air guided from the blowing means by way of the guide hole can be blown out from the through holes of the second pad disposed at various positions after having been distributed in various directions efficiently by the air distributing groove. At the side support portion, air flows to inside of the net-like cushion member by way of the communicating groove from the air path of the seating portion and is drawn out to the surface side of the side support portion while being distributed to be expanded pertinently. Thereby, the firm permeability can be ensured while efficiently distributing air over a wide range including the seating portion and the side support portion.

The hanging member can be constituted by a hanging wire embedded along the hanging groove. In this case, it is preferable to embed the hanging wire to the first pad by insert forming. Further, it is preferable to expose the hanging wire from a bottom face of the hanging groove only at a portion of the cover seat locked by the locking piece. According thereto, a portion of locking the cover seat can freely be designed while firmly holding the hanging wire. Further, the hanging wire formed by inserting forming can be exposed by only cutting the hanging groove, and therefore, fabrication thereof is also facilitated. At this occasion, it is necessary to cut the bottom face of the hanging groove more or less until the back side of the hanging wire such that the locking piece of the cover seat can easily be locked. Hence, when the communicating groove is formed on the back side of the exposed portion of the hanging wire, time and labor of purposely forming the communicating groove at other than the exposed portion of the hanging wire can be saved, and a portion of a space of the communicating groove can effectively be utilized also as a space for locking, and therefore, the constitution is efficient.

It is preferable to pass the communicating groove on the back side of the exposed portion of the hanging wire. Further, it is preferable to align a plurality of pieces of the communicating grooves. When a plurality of pieces of the communicating grooves are aligned, air to the side support portion can further firmly be distributed.

DETAILED DESCRIPTION OF THE INVENTION

Figure 1:
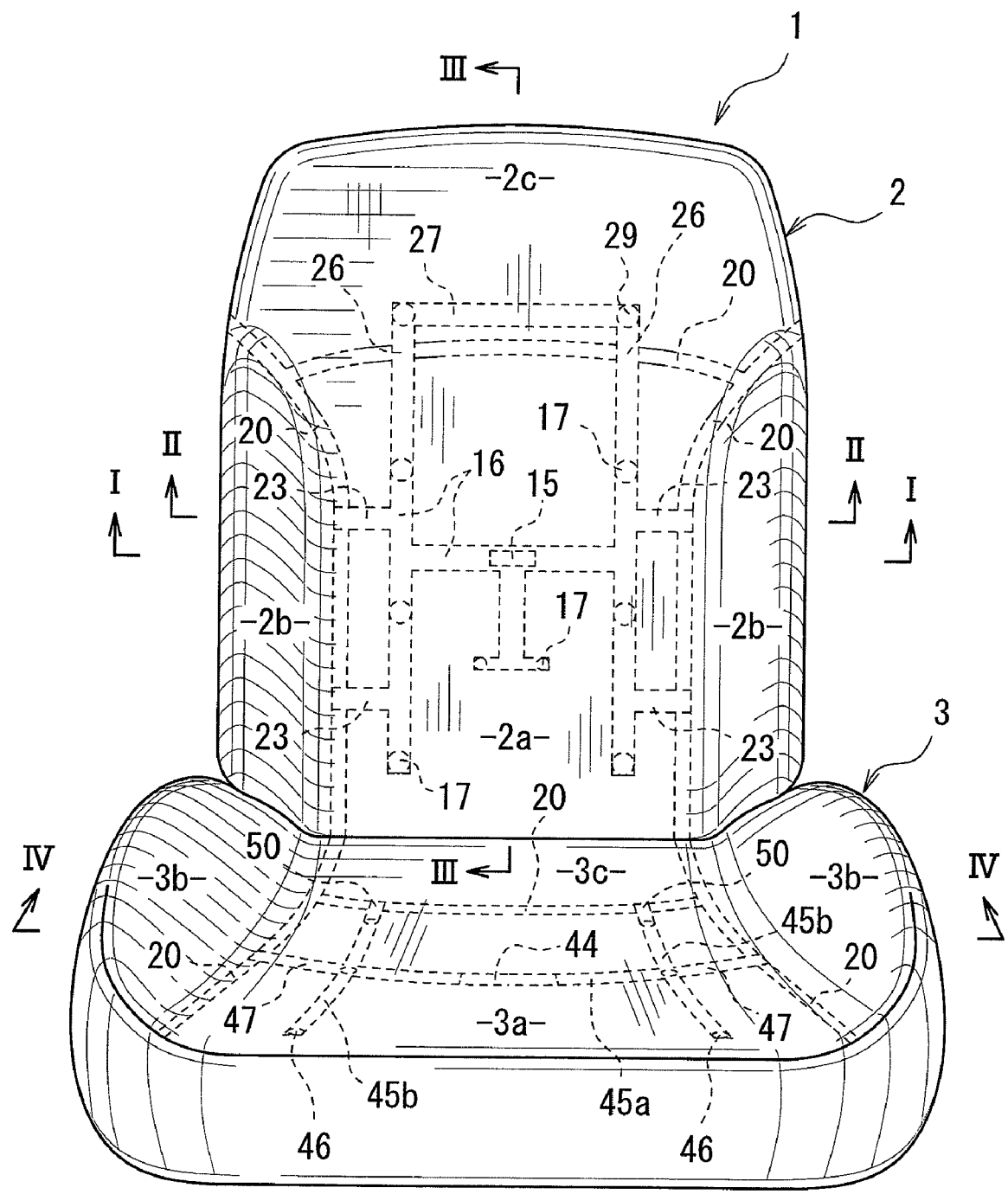
FIG. 1 is a front view of an air conditioning seat.

Air conditioning seat 1 is a vehicular seat mounted to a vehicle of an automobile or the like. As shown by FIG. 1, the air conditioning seat 1 includes a seat back 2 and a seat cushion 3. A front face (surface) of the seat back 2 and an upper face (surface) of the seat cushion 3 respectively include seating portions containing the body of a passenger and side support portions 2b and 3b for auxiliary supporting the passenger. The side support portions 2b and 3b extend from left and right outer sides of the seating portions integrally and continuous to seat surface sides of the respective seating portions. Back faces of the seat back 2 and the seat cushion 3 are respectively arranged with blowing means (refer to FIGS. 5 through 8). Further, back faces of the seat back 2 and the seat cushion 3 are respectively formed with air distributing grooves 16, 27 and 45 for distributing air guided from guide holes 15 and 44 in various directions in plane directions of the seat back 2 and the seat cushion 3. Air distributed by the air distributing grooves 16, 27 and 45 is blown out from air blow out ports 17, 29 and 46 bored at a plurality of portions. Hanging grooves 20 are formed at boundaries of the respective seating portions and the two left and right side support portions 2b and 3b of the seat back 2 and the seat cushion 3. A seat cover 7 for covering the surfaces of the seat back 2 and the seat cushion 3 are hung from and fixed to the respective hanging grooves 20. Also regions of the seating portions of the seat back 2 and the seat cushion 3 are formed with the hanging grooves 20 extended in width directions of the seating portions to divide the seating portions in two. Thereby, the seating portions are divided into main seating portions 2a and 3a and sub seating portions 2c and 3c. The main seating portions 2a and 3a are regions of the seating portions having large areas of being brought into contact with the passenger. The sub seating portions 2c and 3c are regions having areas of being brought into contact with the passenger smaller than those of the main seating portions 2a and 3a.

Figure 2:
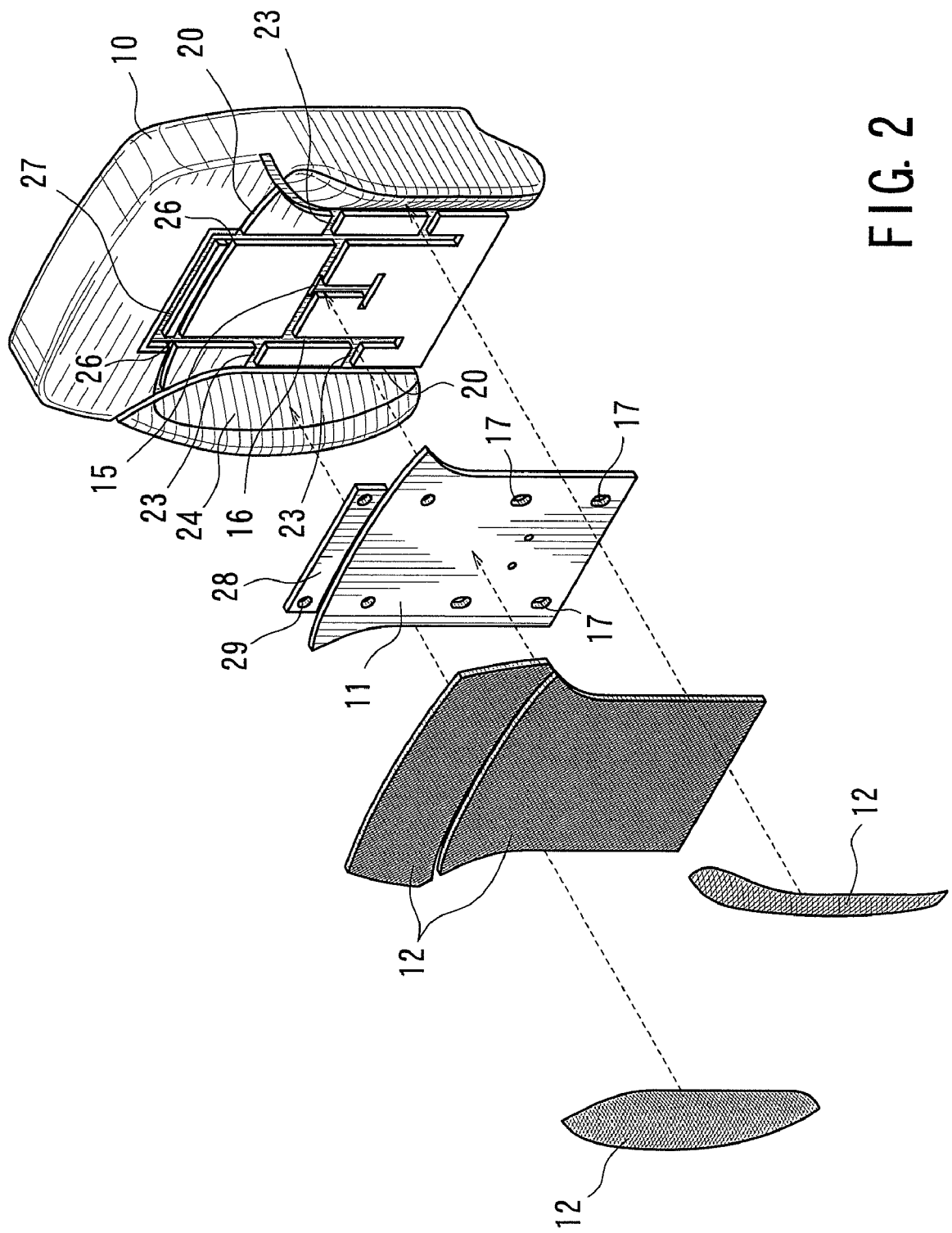
FIG. 2 is a disassembled perspective view of a seat back.
Figure 5:
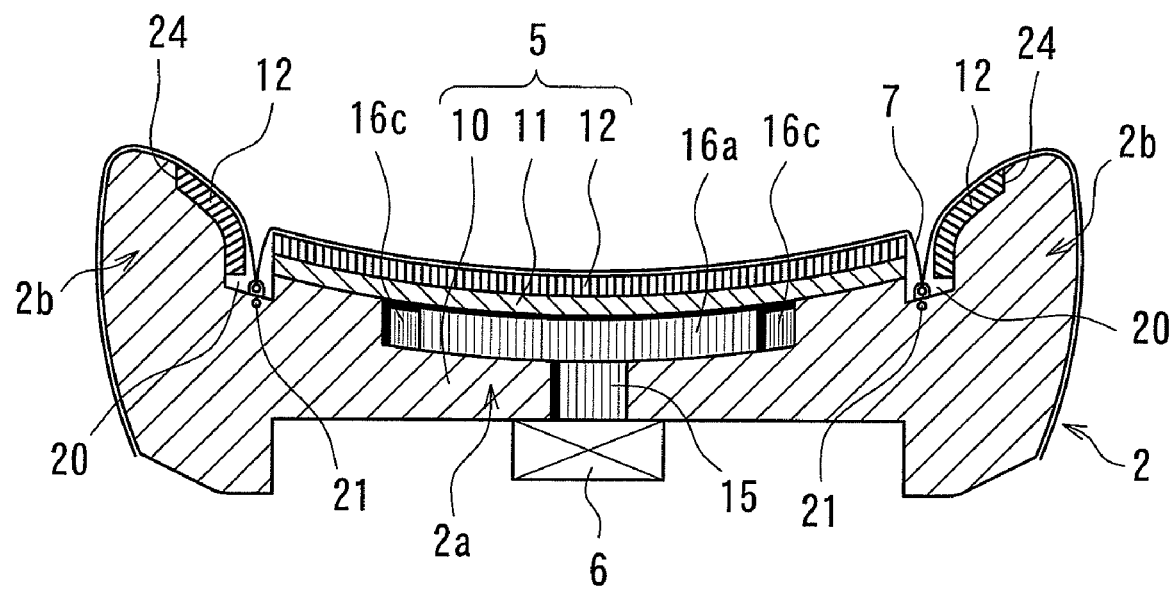
FIG. 5 is a sectional view taken along a line I-I of FIG. 1.
Figure 6:
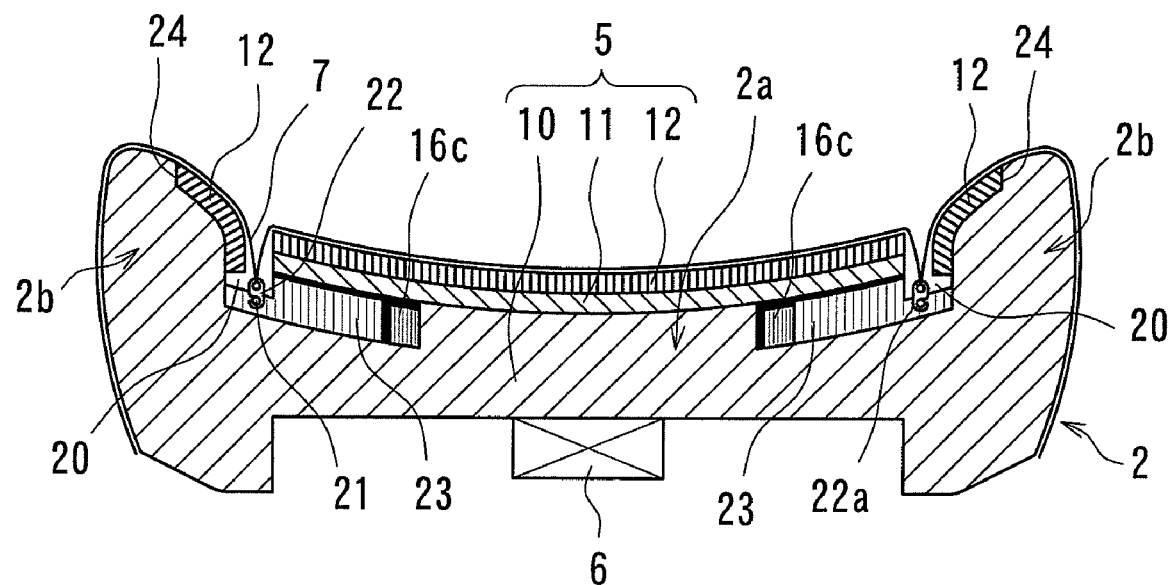
FIG. 6 is a sectional view taken along a line II-II of FIG. 1.
Figure 7:
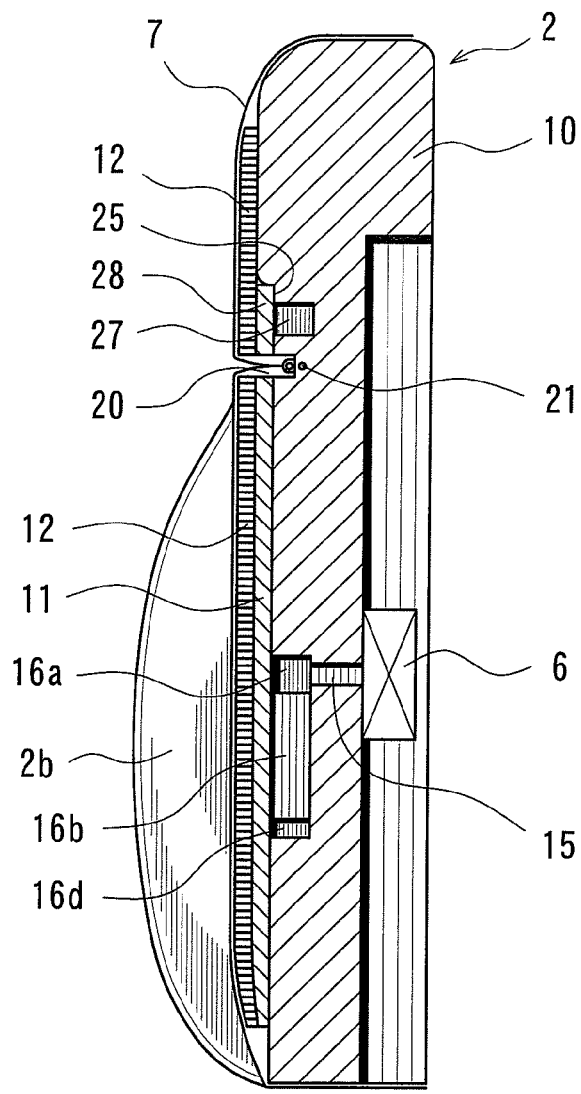
FIG. 7 is a sectional view taken along a line III-III of FIG. 1.

The seat back 2 will be explained in reference to FIG. 1 through FIG. 7. As shown by FIGS. 5 through 7, the seat back 2 includes a back pad 5, a blower 6 constituting blowing means, and the seat cover 7. The back pad 5 constitutes a cushion member. The back pad 5 corresponds to the seat pad of the invention. The blower 6 blows air from a back face of the back pad 5 into the back pad 5. The seat cover 7 covers the back pad 5. As shown by FIG. 2, the back pad 5 includes the main seating portion 2a at a front face center portion, the side support portions 2b and 2b on the left and right outer sides, and the sub seating portion 2c on an upper side of the main seating portion 2a. The back pad 5 is constituted by a first back pad 10, thin-walled second back pads 11 and 28 arranged at front faces of the main seating portion 2a and the sub seating portion 2c of the first back pad 10, and net-like cushion members 12 arranged at front faces of the second back pads 11 and 28 and the front faces of the two left and right side support portions 2b and 2b of the first back pad 10. The first back pad 10 is thick-walled and constitutes a main body of the back pad 5. The second back pads 11 and 28 are more thin-walled than the first back pad 10. The net-like cushion member 12 is constituted by a three-dimensional solid structure by fiber members. Thereby, the net-like cushion member 12 is provided with a constant elasticity and is made to be permeable in a thickness direction and a plane direction. The first back pad 10, the second pads 11 and 28, and the net-like cushion member 12 are bonded to each other by adhering or the like. The first back pad 10 and the second back pads 11 and 28 are formed by urethane foam.

Figure 3:
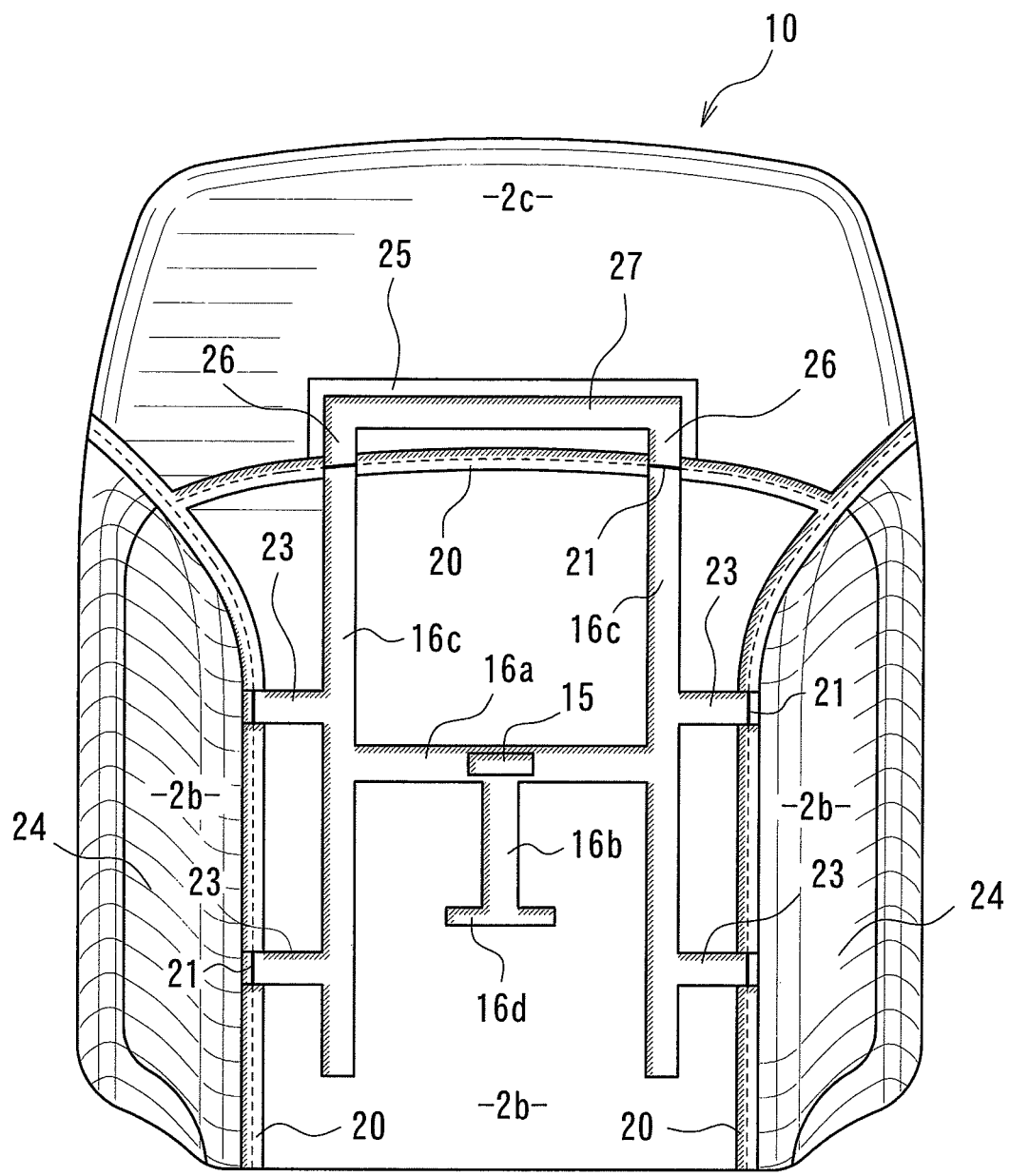
FIG. 3 is a front view of a first back pad.

As shown by FIG. 3, the main seating portion 2a of the first back pad 10 includes guide hole 15 penetrated from the back face over to the front face, and a series of air distributing grooves 16 in communication with the guide hole 15. The guide hole 15 guides the air blown from blower 6 into the first back pad 10. The air distributing groove 16 is recessed to be formed in a groove-like shape at the front face of the first back pad 10 and expanded in various directions in the plane direction. As shown by FIGS. 1 and 2, the second back pad 11 is bored with the plurality of through holes 17 constituting air blow out ports in a state of being penetrated from the back face of the second back pad 11 over to the surface. The respective through holes 17 are formed at positions of facing the air distributing grooves 16 of the first back pad 10. As shown by FIG. 3, the through hole 15 is bored slightly on an upper side of a center portion in a left and right direction of the main seating portion 2a. The air distributing groove 16 is constituted by an upper lateral air distributing groove 16a extended from the guide hole 15 in two left and right side directions, a center vertical air distributing groove 16b extended from the guide hole 15 to a lower side, left and right vertical air distributing grooves 16c and 16c extended in the up and down direction by being communicated with both ends of the upper lateral air distributing groove 16a on two left and right sides of the main seating portion 2a, a short center lateral air distributing groove 16d extended in a left and right direction by communicating with a lower end of the center vertical air distributing groove 16b at a center portion in the up and down direction of the main seating portion 2a. The second back pad 11 includes through holes 17 at three portions in the up and down direction substantially at equal intervals and at both ends of the center lateral air distributing groove 16d at positions facing the left and right vertical air distributing grooves 16c and 16c. The air distributing groove 16 constitutes an air distributing path by covering the air distributing groove 16 of the first back pad 10 by the second back pad 11. An air path of the invention is constituted by the guide hole 15 and the air distributing groove 16 of the first back pad 10, as well as the through hole 17 of the second back pad 11. The through hole 17 of the second back pad 11 is covered by the net-like cushion member 12.

Figure 4:
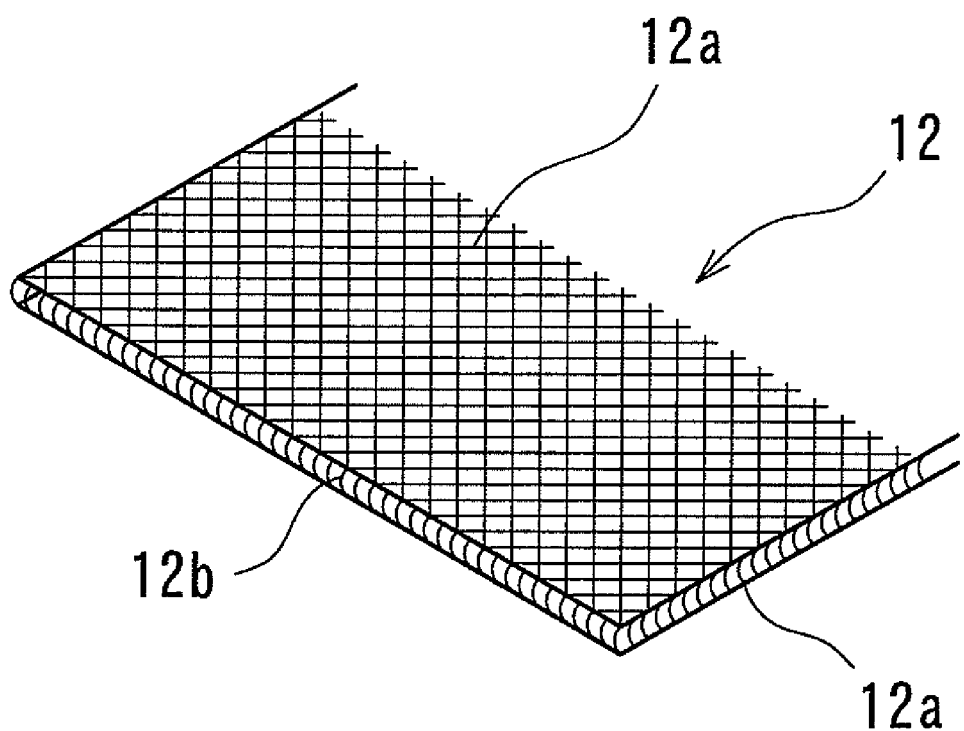
FIG. 4 is an outline perspective view of a net-like cushion member.

As shown by FIG. 4, the net-like cushion member 12 is a sheet-like member having a predetermined thickness. The net-like cushion member 12 constitutes a three-dimensional structure bridging two sheets of mesh sheets 12a and 12a by a fiber member 12b constituted by a number of high rigidity fibers. Specifically, a number of the slightly bent fiber members 12b in an erected state are welded to the fiber-like skeleton portion of the mesh sheet 12a. Thereby, the net-like cushion member 12 is made to be permeable by meshes of the mesh sheet 12a in a thickness direction thereof and made to be permeable among the fiber members 12b in a plane direction thereof. Further, the net-like cushion member 12 is provided with constant elasticity in the thickness direction by being bridged by a number of the bent high rigidity fiber members 12b.

As shown by FIG. 3, the front face of the first back pad 10 is recessed to be formed with the hanging grooves 20 on the boundaries of the main seating portion 2a and the left and right side support portions 2b and 2b, and the hanging groove 20 for dividing the seating portion region in two of the main seating portion 2a and the upper sub seating portion 2c. A depth side of the hanging groove 20 is embedded with a hanging wire 21 to be along the hanging groove 20 by insert forming. Portions of the hanging wire 21 are exposed from a bottom face of the hanging groove 20 at a plurality of portions thereof in a state of deeply cutting pertinent portions of the bottom face of the hanging groove 20. A locking piece 22 having a hook portion 22a in a J-like shape is sewn to a pertinent portion at the back face of the seat cover 7. The exposed portion of the hanging wire 21 and the locking piece 22 are brought into a positional relationship of being opposed to each other. As shown by FIG. 6, when the seat cover 7 is covered to the back pad 5, by locking the hook portion 22a of the locking piece 22 to the hanging wire 21, the seat cover 7 is hung and fixed in a state of being drawn to inside of the hanging groove 20. Thereby, the seat cover 7 is brought into close contact with the back pad 5 to cover in a state of following the shape of the back pad 5. According to the embodiment, the hanging wire 21 and the locking piece 22 are locked by each other at two portions in each of the hanging grooves 20.

As shown by FIGS. 5 through 7, the net-like cushion members 12 of the main seating portion 2a, the side support portion 2b, and the sub seating portion 2c are arranged in a state in which respective end faces thereof face the hanging grooves 20. Further, the net-like cushion member 12 of the side support portion 2b is bonded to inside of a recess portion 24 recessed to be formed at the front face of the side support portion 2b. Thereby, the front face of the net-like cushion member 12 and the front face of the back pad 10 are made to be substantially flush with each other. As shown by FIG. 3, a plurality of communicating grooves 23 reach the net-like cushion members 12 and 12 of the left and right side support portions 2b and 2b from the air distributing grooves 16 of the main seating portion 2a are recessed to be formed. Each communication groove 23 is positioned a distance from the upper lateral air distributing groove 16a and each through-hole 17, thereby creating a position gap of second back pad 11. As shown by FIG. 6, the respective communicating grooves 23 are formed to be deeper than the hanging grooves 20 such that the hanging wires 21 are exposed. Also the air distributing groove 16 is constituted by a depth the same as that of the communicating groove 23. Thereby, a portion of air distributed to inside of the air distributing groove 16 is able to communicate with the left and right side support portions 2b smoothly by passing the back side of the exposed portion of the hanging wire 21.

Also the sub seating portion 2c of the back pad 5 is formed with an air path similar to that of the main seating portion 2a. Specifically, as shown by FIGS. 2 and 3, the sub seating portion 2c of the first back pad 10 is recessed and formed with an air distributing groove 27 in the groove-like shape extended in the left and right direction at the front face. The second back pad 28 is bonded to the front face of the sub seating portion 2c of the first back pad 10. The second back pad 28 is provided with a thickness the same as that of the second back pad 11 of the main seating portion 2a. The second back pad 28 covers the air distributing groove 27. Also the second back pad 28 is bored with a through hole 29 penetrated from the back face over to the front face. The respective groove holes 29 are disposed at positions facing both ends of the air distributing groove 27. As shown by FIG. 7, the second back pad 28 is bonded to inside of the recess portion 25 recessed and formed at the front face of the first back pad. The front face of the second back pad 28 and the front face of the first back pad 10 are substantially flush with each other. The front face of the sub seating portion 2c is bonded with the net-like cushion member 12 in a state in which a one end face thereof faces the hanging groove 20. An air path of the sub seating portion 2c is constituted by the air distributing groove 27 and the through hole 29.

The air path of the sub seating portion 2c is not formed with a guide hole for directly receiving air from the blower 6. Hence, as shown by FIGS. 1 through 3, the communicating groove 26 for communicating the air path of the main seating portion 2a and the air path of the sub seating portion 2c is formed. Specifically, two left and right pieces of the communicating grooves 26 reaching both ends of the air distributing groove 27 of the sub seating portion 2c from upper ends of two left and right pieces of the left and right vertical air distributing grooves 16c and 16c of the main seating portion 2a are formed by way of the hanging groove 20. Also the two communicating grooves 26 are formed to be deeper than the hanging groove 20 such that the hanging wire 21 is exposed and constituted by a depth the same as that of the air distributing grooves 16 and 27. Thereby, air blown from the air distributing groove 16 of the main seating portion 2a is guided to the air distributing groove 27 of the sub seating portion 2c smoothly by passing a back side of an exposed portion of the hanging wire 21.

When an interval between the two left and right through holes 29 are connected by the air distributing groove 27, even in a case in which a large load is operated only at a portion of one of the through holes 29 by an attitude of the passenger of being seated diagonally, and air is difficult to be blown from a periphery of the one through hole 29, air is distributed to a side of the other through hole 29, and air can efficiently be blown out from a periphery of the other through hole 29.

Next, operation of the seat back 2 will be explained. First, as shown by FIGS. 5 and 7, air is forcibly blown from blower 6 arranged at the back face of the back pad 5 to the guide hole 15 of the main seating portion 2a. At the main seating portion 2a, air guided from the guide hole 15 is distributed to branch planarly in various directions at inside of the air distributing groove 16 (refer to FIGS. 1, 5 and the like). Air is blown out from the respective through holes 17 constituting air blow out ports. The air blown out from the respective through holes 17 is drawn to the front face of the air conditioning seat 1 by way of the net-like cushion member 12 and the seat cover 7. Here, the main seating portion 2a is a portion operated with the load of the passenger the most and also a portion which needs to be air conditioned the most. Therefore, the air distributing groove 16 at the main seating portion 2 is formed over a wide range and also the plurality of pieces of through holes 17 communicated therewith are formed over a wide range. Thereby, the main seating portion 2a can be air-conditioned as uniformly as possible while efficiently arranging air over a total face of the main seating portion 2a. Even when the passenger is seated on the air conditioning seat 1, it is avoided that the air blow out port 17 of the air path is closed by the body of the passenger by bonding the net-like cushion member 12 having the constant elasticity in the thickness direction at the front face of the second back pad 11. Furthermore, even when the body of the passenger is brought into close contact with the main seating portion 2a, air is expanded in the plane direction at inside of the net-like cushion member 12 and arranged to avoid the body of the passenger.

Simultaneously therewith, a portion of air distributed at inside of the air distributing groove 16 of the main seating portion 2a is distributed also to the net-like cushion members 12 of the left and right side support portions 2b and 2b by way of the communicating groove 23 (refer to FIGS. 1, 6 and the like). Specifically, a portion of air distributed in various directions at inside of the air distributing groove 16 by being guided from the guide hole 15 of the main seating portion 2a reaches the net-like cushion member 12 of the side support portion 2b facing the hanging groove 20 by passing the back face of the exposed portion of the hanging wire 21 locked by the locking piece 22 of the sheet cover 7 from the communicating groove 23. Thereby, a flow of air reaching the side support portion 2b from the main seating portion 2a is not hampered by the seat cover 7, the locking piece 22 or the like. Further, the communicating groove 23 is brought into a positional relationship of being positionally shifted from the upper lateral air distributing groove 16a of the air distributing groove 16 and the through hole 17. Thereby, air is prevented from being distributed to the communicating groove 23 directly from the upper lateral air distributing groove 16a. Therefore, air is blown out from the respective through holes 17 while being efficiently arranged in the up and down direction. Air reaching the side support portion 2b by moving over the hanging groove 20 flows into the net-like cushion member 12 of the portion and is drawn out from the front side of the side support portion 2b by way of the seat cover 7 while being distributed to expand in the plane direction at inside of the net-like cushion member 12. Thereby, air conditioning of the side support portion 2b is also ensured.

Further, a portion of air distributed to inside of the air distributing groove 16 of the main seating portion 2a is arranged also to the air path of the sub seating portion 2c by way of the communicating groove 26 (refer to FIGS. 1, 6 and the like). Specifically, a portion of air guided from the guide hole 15 of the main seating portion 2a and distributed in various directions inside the air distributing groove 16 is distributed to the air distributing groove 27 of the sub seating portion 2c by way of the left and right communicating grooves 26 extended on the upper sides of the two left and right vertical air distributing grooves 16c of the air distributing groove 16. Also the left and right air communicating grooves 26 are formed to pass the back face of the exposed portion of the hanging wire 21. Air distributed to the sub seating portion 2c by moving over the hanging groove 20 flows to inside of the net-like cushion member 12 from the through hole 29 and is drawn out to the front side of the side support portion 2b by way of the seat cover 7 while being distributed expanded in the plane direction at inside of the net-like cushion member 12. Also operation of the net-like cushion member 12 with regard to the load of the passenger at the sub seating portion 2c is similar to operation at the main seating portion 2a. Further, by communicating the left and right through holes 29 by the air distributing groove 27 as described above, even a deviation of the load by the attitude of seating of the passenger can precisely be dealt with.

Figure 8:
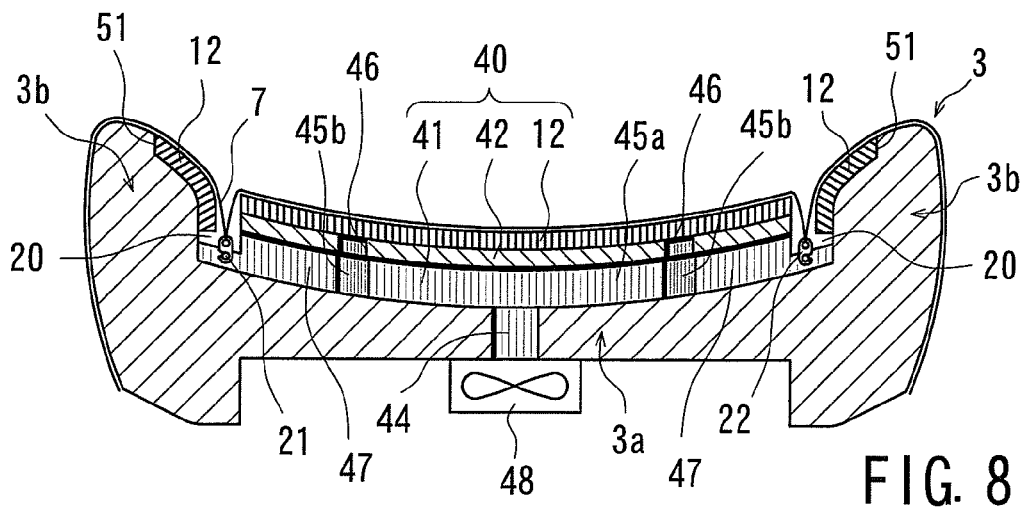
FIG. 8 is a sectional view taken along a line IV-IV of FIG. 1.

Next, the seat cushion 3 will be explained. Also an air conditioning mechanism of the seat cushion 3 is basically similar to an air conditioning mechanism of the seat back 2. An outline of the seat cushion 3 will be explained as follows. In FIG. 1, also a region of the upper face (surface) of the seat cushion 3 is formed with the main seating portion 3a, the side support portions 3b are integrally continuous to left and right outer sides of the main seating portion 3a and extend to the upper (surface) side more than the main seating portion 3a Also, the sub seating portion 3c is integrally continuous to the back side of the main seating portion 3a by way of the hanging groove 20 and bulged to the upper side more than the main seating portion 3a. As shown by FIG. 8, the seat cushion 3 includes a cushion pad 40 constituting a cushion member, a fan 48 as blowing means for blowing air to inside of the cushion pad 40 from a lower face of the cushion pad 40, and the seat cover 7 covering the cushion pad 40 and having a permeability. The cushion pad 40 corresponds to the seat pad of the invention. The cushion pad 40 includes the main seating portion 3a, the side support portions 3b and 3b, and the sub seating portion 3c at the upper face and is constituted by a thick-walled first cushion pad 41 constituting a main body of the cushion pad 40, a thin-walled second cushion pad 42 bonded to an upper face of the main seating portion 3a of the first cushion pad 41, and the net-like cushion member 12 bonded to the upper face of the second cushion pad 42 and the upper faces of the two left and right side support portions 3b and 3b and the sub seating portion 3c of the first cushion pad 41.

In FIG. 1, the main seating portion 3a of the first cushion pad 41 is recessed and formed with an air distributing groove 45 in a groove-like shape communicating with the guide hole 44. A plurality of through holes 46 constituting air blow out ports are formed at positions of the second cushion pad 42 facing the air distributing groove 45. The air distributing groove 45 is formed by a shape of H constituted by a lateral air distributing groove 45a in a left and right direction passing above the guide hole 44, and vertical air distributing grooves 45b and 45b in a front and rear direction communicated with both ends of the lateral air distributing groove 45a on two left and right sides of the main seating portion 3a. An air path of the invention is constituted by the guide hole 44, the air distributing groove 45 and the through hole 46, and the through hole 46 of the second cushion pad 42 is covered by the net-like cushion member 12.

Also the seat cushion 3 is recessed to be formed with the hanging grooves 20 respectively on boundary lines of the main seating portion 3a and the left and right side support portions 3b and 3b and in a width direction of the seat cushion 3 on the rear side of the seating portion. Portions of the hanging wires 21 formed by insert forming are exposed at a plurality of portions from the bottom faces of the hanging grooves 20. As shown by FIG. 8, by locking the locking piece 22 of the seat cover 7 by the hanging wire 21, the seat cover 7 is fixed in a state of being drawn to inside of the hanging groove 20. Thereby, the seat cover 7 is brought into close contact to cover the cushion pad 40 in a state of following shapes thereof. Also the net-like cushion members 12 of the main seating portion 3a, the side support portion 3b, and the sub seating portion 3c are arranged in a state in which respective end faces thereof face the hanging grooves 20. A plurality of pieces of communicating grooves 47 reaching the net-like cushion members 12 and 12 of the left and right side support portions 3b and 3b are recessed and formed by passing a rear (lower) side of an exposed portion of the hanging wire 21 at inside of the hanging groove 20 from the air distributing groove 45 of the main seating portion 3a. Also here, the respective communicating grooves 47 are formed to be deeper than the hanging grooves 20 such that the hanging wires 21 are exposed as shown by FIG. 8. Also the air distributing groove 45 is constituted by a depth the same as that of the communicating groove 47.

Next, a point which differs from the seat back 2 will be explained. The air path is not formed at the sub seating portion 3c of the seat cushion 3. That is, the sub seating portion 3c of the first cushion pad 41 is not formed with a guide hole or an air distributing groove. Also the second cushion pad is not arranged. Hence, the cushion pad 40 is provided with a communicating groove 50 communicating the main seating portion 3a and the sub seating portion 3c. Specifically, the communicating grooves 50 are recessed and formed at two left and right portions to reach the net-like cushion members 12 of the sub seating portion 3c by passing the back side of the exposed portion of the hanging wire 21 at inside of the hanging groove 20 for dividing the main seating portion 3a and the sub seating portion 3c from the air distributing groove 45 of the main seating portion 3a. The communicating grooves 50 are disposed on extensions of the left and right vertical air distributing grooves 45b of the air distributing groove 45. Thereby, it is designed such that air is efficiently distributed also to the sub seating portion 3c having a large distance from the guide hole 44.

The respective net-like cushion members 12 of the side support portion 3b and the sub seating portion 3c are bonded to inside of a recess portion 51 recessed to be formed at upper faces of the side support portion 3b and the sub seating portion 3c. Thereby, the point that the upper face of the net-like cushion member 12 and the upper face of the first cushion pad 41 are flush is similar to that of the seat back 2. Further, the point that the respective communicating grooves 50 are deeper than the hanging grooves 20 and the air distributing groove 45 and the respective communicating grooves 50 are constituted by the same depth is similar to the communicating groove 47. Other detailed point thereof and operation of the seat cushion 3 by such a constitution (flow of air or the like) are similar to those of the seat back 2, and therefore, an explanation thereof will be omitted. Particularly, operation of the sub seating portion 3c of the seat cushion 3 is similar to operation of the side support portion 2b of the seat back 2.

The aforementioned disclosure are examples of the present invention, and as such is not particularly limited to only those examples. For example, an air distributing path of the air distributing groove can be designed in various directions so far as the path is a path capable of distributing air in a wide range. Also, a position forming the through hole constituting the air blow out port and a number of pieces thereof is not particularly limited. In view of efficient air conditioning, the number is preferably about 4 to 10 pieces. Further, the air path can also be formed at the side support portion. Also the net-like cushion member of the above-described embodiment can be used so far as the net-like cushion member is constituted to be permeable in the up and down direction and in the left and right direction while having a constant elasticity in the thickness direction. For example, the fiber member in a loop-like shape or a wavy shape may be welded between two sheets of mesh sheets. Further, other than the wavy shape or the loop-like shape, a shape of a metal brush complicatedly entangled with an irregularly bent fiber member can also be used. The blowing means can be made to be able to blow heating air or cooling air to inside of the air conditioning seat by pertinently providing heating and/or cooling means.

Although according to the embodiment, the air distributing groove and the communicating groove are formed to be deeper than the hanging groove, the groove is not limited thereto so far as the groove is constructed by a constitution in which at least air is distributed by passing the back side of the hanging wire. For example, only the communicating groove can be formed to be deep by constituting the air distributing groove and the hanging groove by the same depth. Further, it is not necessary that the communicating groove is constituted by the same depth over an entire length thereof but may be formed deeply only at a portion of intersecting with the hanging wire.

What is claimed is:

1. An air conditioning seat comprising:
    a seat pad integrally including a seating portion and a side support portion;
    a blower for blowing air to an air path formed on the seat pad;
    a permeable seat cover covering the seat pad; and
    a cushion member having a net structure and a constant elasticity and capable of permeating air in a thickness direction and in a plane direction;
    wherein left and right outer surfaces of the side support portion are raised more than the seating portion,
    the air path is formed at the seating portion of the seat pad,
    the seat cover is provided with a locking piece at a back face thereof,
    the cushion member has a fiber member structure,
    a hanging groove is formed on a boundary between the seating portion and the side support portion,
    a hanging member is provided at the inside of the hanging groove,
    the locking piece is locked by the hanging member,
    the cushion member is arranged at a surface of the seating portion and a surface of the side support portion,
    an air blow out port of the air path is covered by the cushion member, and a
    communicating path extends to the cushion member at the side support portion from the air path at the seating portion and is formed by passing a back side of the hanging member.

2. The air conditioning seat according to claim 1,
wherein the seat pad includes a first pad constituting a main body of the seat pad and a second pad arranged on a surface of a seating portion of the first pad,
the seating portion, the side support portion and the hanging groove are formed at the first pad,
the cushion member includes a first cushion member which is arranged at a surface of the second pad and a second cushion member which is arranged at a surface of the side support portion of the first pad,
each of the first and second cushion members is arranged in a state in which respective end faces are adjacent the hanging groove,
the air path includes a guide hole formed at the first pad, a series of air distributing grooves can communicate with the guide hole, and a plurality of through holes includes air blow out ports,
the guide hole is penetrated from a back face over to the surface of the first pad,
the air distributing groove is recessed and extended in various directions at the seating portion,
the through holes are bored in a penetrated state from a back face to a surface of the second pad at positions adjacent to the series of air distributing grooves; and
a communicating path is formed as a communicating groove communicating with the second cushion member of the side support portion by passing the back side of the hanging member to the inside of the hanging groove from the air distributing groove.

3. The air conditioning seat according to claim 2,
wherein the hanging member comprises a hanging wire embedded along the hanging groove,
the hanging wire is embedded in the first pad by insert forming,
the hanging wire is exposed from a bottom face of the hanging groove at a portion locked by the locking piece of the cover seat; and
the communicating groove passes through the back side of the exposed portion of the hanging wire.

4. The air conditioning seat according to claim 3,
wherein a plurality of pieces of the communicating groove are aligned.

* * * * *